(12) United States Patent
Leutsch

(10) Patent No.: US 6,813,803 B2
(45) Date of Patent: Nov. 9, 2004

(54) WIPER STRIP FOR WINDSHIELD WIPERS

(75) Inventor: Wolfgang Leutsch, Buehlertal (DE)

(73) Assignee: Robert Bosch GmbH, Stuttgart (DE)

( * ) Notice: Subject to any disclaimer, the term of this patent is extended or adjusted under 35 U.S.C. 154(b) by 223 days.

(21) Appl. No.: 10/030,284

(22) PCT Filed: Apr. 11, 2001

(86) PCT No.: PCT/DE01/01418
§ 371 (c)(1),
(2), (4) Date: Mar. 20, 2002

(87) PCT Pub. No.: WO01/85503
PCT Pub. Date: Nov. 15, 2001

(65) Prior Publication Data
US 2003/0005540 A1 Jan. 9, 2003

(30) Foreign Application Priority Data
May 10, 2000 (DE) ......................................... 100 22 724

(51) Int. Cl.[7] ................................................ A47L 1/00
(52) U.S. Cl. ..................... 15/250.48; 15/245; 15/250.4; 15/250.43; 15/250.44; 15/250.06
(58) Field of Search ....................... 15/250.48, 250.451, 15/250.43, 250.44, 250.06, 250.4, 245

(56) References Cited

U.S. PATENT DOCUMENTS 3,428,997 A    2/1969   Rickett
5,893,193 A  * 4/1999   Nagy ...................... 15/250.48

FOREIGN PATENT DOCUMENTS

DE    91 04 461.8    9/1992
WO    00 05111 A     2/2000

OTHER PUBLICATIONS

Patent Abstracts of Japan vol. 010, No. 299 (M–524), Oct. 11, 1986 & JP 61 110652, May 28, 1986.

* cited by examiner

Primary Examiner—Deborah Jones
Assistant Examiner—Abraham Bahta
(74) Attorney, Agent, or Firm—Michael J. Striker

(57) ABSTRACT

A wiper strip (18) for windshield wipers includes a profile spine (20) and a function part (22) that is connected to the profile spine (20) via a tilting bridge piece (26) and that bears against it in the tilted position. The functional part (22) includes a supporting section (30) that is connected to the profile spine (20) via the first tilting bridge piece (26) and to a wiper wedge (32) via a second tilting bridge piece (28).

8 Claims, 3 Drawing Sheets

WIPER STRIP FOR WINDSHIELD WIPERS

BACKGROUND OF THE INVENTION

The invention is based on a wiper strip for windshield wipers.

Known windshield wipers comprise a wiper arm constructed out of a mounting part and a hinged part with a wiper bar hinge-mounted on the mounting part via a hinged joint. A hook-shaped end of the wiper bar usually grips in a hinging compartment of a wiper blade that is formed by two lateral supports of a center strap, and encloses a pivot pin. The joint designed in this fashion guides the wiper blade over the vehicle window during the swivelling movement.

The wiper blade consists of a multisectional carrying strap system with secondary straps hinge-mounted on the center strap, of which at least a few hold a wiper strip by means of claws on their ends. The long wiper strip is made of rubber and has a profile having two main sections: a profile spine, and a functional part. The wiper strip is connected to the carrying strap system at the profile spine and, in fact, by the claws of the claw straps gripping in opposing longitudinal grooves of the profile spine. In so doing, the claws enclose a part of the profile spine that comprises at least one further longitudinal groove in which a spring is housed. If two springs are used, they lie symmetrically arranged in opposing longitudinal grooves. Wiper blades are also known in which a spring is provided in a centrical longitudinal channel of the profile spine. During operation, the springs should evenly distribute a bearing force directed toward the wiper blade across the entire length of the wiper strip and stiffen it at the same time.

The profile spine is connected to the functional part of the wiper strip—which comprises a wiper wedge and a wiper lip—via a thin bridge piece. The cross-section of the wiper wedge has the shape of a nearly isosceles triangle, the base side of which points toward the connecting bridge piece, while the wiper lip is integrally moulded on the tip. During wiping, the wiper blade is loaded in the direction toward the vehicle window by means of the bearing force, and the wiper lip bears against the vehicle window. Additionally, a force created by the swivelling movement acts transversely on the rubber profile. While the profile spine is moved by the side force, the wiper lip remains in its position at first. The thin bridge piece between the profile spine and the functional part thereby acts as a tilting joint due to its high elastic deformability, so that the wiper lip on the functional part more or less takes on a pitch of 45° in relation to the glass surface. This dragged position is the working position of the wiper lip. In this position, the wiper wedge is tipped over so far that its outside top shoulder touches the underside of the profile spine.

As a result of the oscillating wiping motion of the windshield wiper, reversal points result in the end positions of the motion. Here, the wiper wedge folds over in the opposite direction and then assumes a dragged working position once more. This process of folding over produces an unpleasant noise in traditional windshield wipers. Additionally, the wiper rubber is elastically deformed to a great extent in the region of the tilting bridge piece. Over the course of service, this leads to a permanent deformation of the wiper rubber profile, which only impairs the wiper function of the windshield wiper at first, but eventually even prevents the folding-over action.

A wiper strip is made known in DE 91 04 461.8 U1 in which a damping strip is provided between the profile spine and the striking shoulder of the wiper wedge. When the functional part of the wiper strip folds over at the reversal point, the shoulder first strikes against the damping strip and pushes it until it comes to rest against the profile spine. As a result, the striking velocity is decelerated, and the noise produced during the folding-over action is quieted. An acute angle $\alpha$ between the damping strip and the profile spine, the tip of which points toward the tilting bridge piece, also causes the damping resistance to increase as the deformation of the damping strip increases. The damping strip prevents the angle of attack of the wiper lip in relation to the vehicle window from being reduced, so that the alternate bending load of the tilting bridge piece is unchanged.

SUMMARY OF THE INVENTION

According to the invention, the functional part of a wiper strip includes a supporting section that is connected to the profile spine via a first tilting bridge piece and to the wiper wedge via a second tilting bridge piece. The cross-section of the supporting section has the shape of an isosceles trapezoid, the base side of which points towards the first tilting bridge piece. The supporting section therefore follows a basic shaping of the functional part, which has its greatest width on the side facing the first tilting bridge piece and decreases continuously toward the exposed end of the wiper lip.

During operation, the functional part tilts in a first action to the side until a top shoulder of the supporting section touches the underside of the profile spine. The wiper lip is now tilted only at a first partial tilt angle. As the movement progresses, the wiper wedge tilts to the side until its top shoulder touches the underside of the supporting region. Only now does the wiper lip have a necessary tilt angle of nearly 45° in relation to the vehicle window. According to the invention, the working position of the wiper lip is reached in two actions that take place at different times. The advantage of this procedure is a dampened folding-over of the functional part of the wiper strip at the reversal points of the swivelling movement combined with a greatly diminished folding-over noise.

A further advantage of this profile design also lies in the fact that an optimal relationship exists between geometric folding-over and elastic deformation, in that the entire tilt angle is distributed over the two tilting bridge pieces and, therefore, the deformation of the functional section associated with this is distributed over the two tilting bridge pieces, so that each tilting bridge piece is loaded with only a part of the alternate bending load. Localized stress overloads that occur in traditional wiper strips having only one tilting bridge piece do not occur here. Moreover, undercuts that expand the height of the open space between the lower edge of the profile spine and the base surface of the trapezoidal supporting section toward the tilting bridge piece reduce the elastic deformability of the first tilting bridge piece. According to the invention, further undercuts are also provided in the open spaces between the supporting section and the wiper wedge. The tilting behavior of the tilting bridge pieces can be coordinated with each other by means of the shaping of the open spaces and undercuts, and preferably in such a fashion that the first tilting bridge piece repeatedly participates in the tilting motion, while the tilting motion of the second tilting bridge piece largely does not take place until the supporting section is already resting against the profile spine.

A reduced elastic deformation favorably affects the life of the wiper rubber and prevents a permanent deformation of the wiper profile from occurring as a result of high elastic deformation over the course of service. The embodiment of the profile spine remains largely unaffected by the design of the functional section according to the invention, so that such wiper rubber profiles can be used in wiper blades with the most diverse claw shapes and in "unarticulated" wiper blades.

BRIEF DESCRIPTION OF THE DRAWINGS

Further advantages arise from the following drawing description. Exemplary embodiments of the invention are presented in the drawing. The drawing, the description, and the claims contain numerous features in combination. One skilled in the art will advantageously consider them individually as well and combine them into reasonable further combinations.

DETAILED DESCRIPTION OF THE PREFERRED EMBODIMENTS

Figure 1:
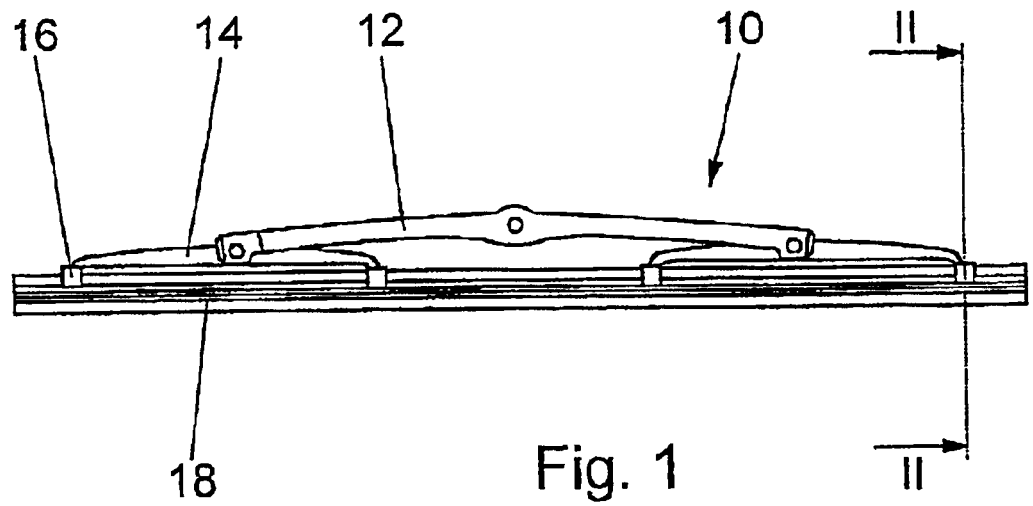
FIG. 1 is a side view of a wiper blade with carrying strap system.

A wiper blade 10 comprises a center strap 12, on the ends of which secondary claw straps 14 with claws 16 for accommodating a wiper strip 18 are hinge-mounted (FIG. 1). The wiper strip 18 is long straggling and is enclosed by the claws 16 at an attachment point at a plurality of points.

Figure 2:
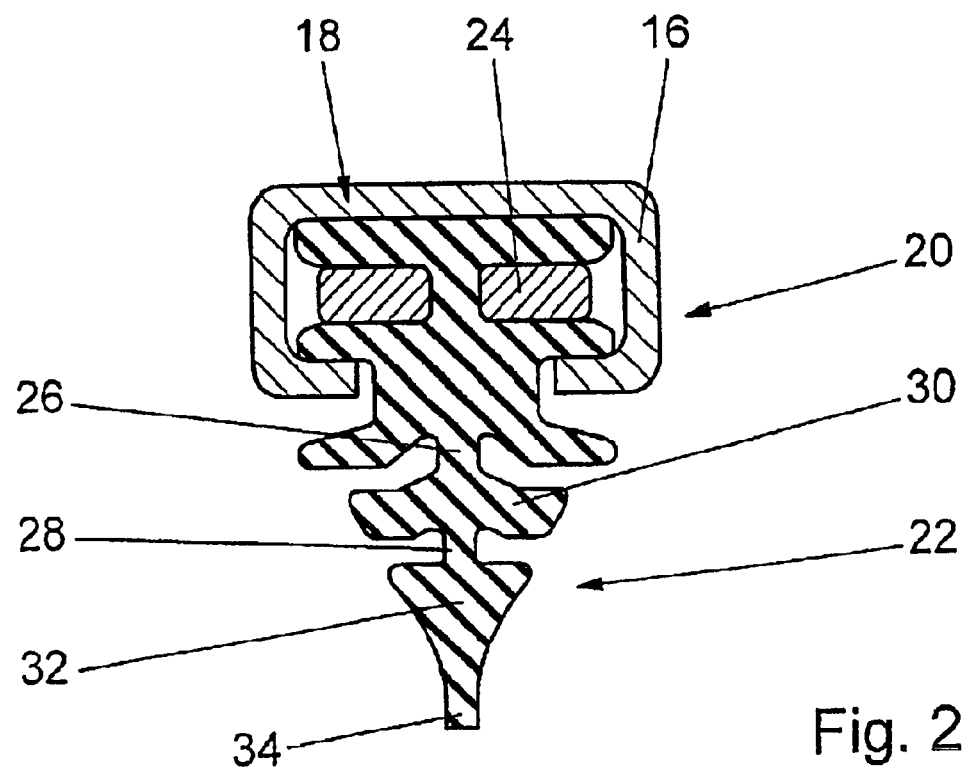
FIG. 2 is an enlarged sectional view along the line II—II in FIG. 1.

FIG. 2 shows an enlarged, sectional view through a claw 16. The claw 16 encloses the attachment point of the wiper strip 18—a "profile spine" 20—that preferably has a total width of 6 to 10 mm and a total height of 3.5 to 7 mm. Additionally, the profile spine 20 is strengthened by two springs 24 as stiffening elements. If only one spring 24 is used, it is usually situated in the center. Depending on the type of vehicle, the thickness of a spring 24 varies between 0.7 and 1.2 mm, and the width varies between 2.5 and 4.5 mm.

The profile spine 20 is connected to the second part of the wiper strip 18—the functional part 22—via a first tilting bridge piece 26. According to the invention, the functional part 22 is formed out of a supporting section 30 and a wiper wedge 32 with integral wiper lip 34. The supporting section 30 thereby abuts the first tilting bridge piece 26 and is connected to the wiper wedge 32 by means of a second tilting bridge piece 28. The functional part 22 also has its greatest width of preferably 4 to 6 mm on the side facing the first tilting bridge piece 26, and the width of the supporting section 30 and the wiper wedge 32 decreases continuously toward the exposed end of the wiper lip 34. Moreover, the functional part 22 advantageously has a total height of 4 to 7 mm.

Figure 3:
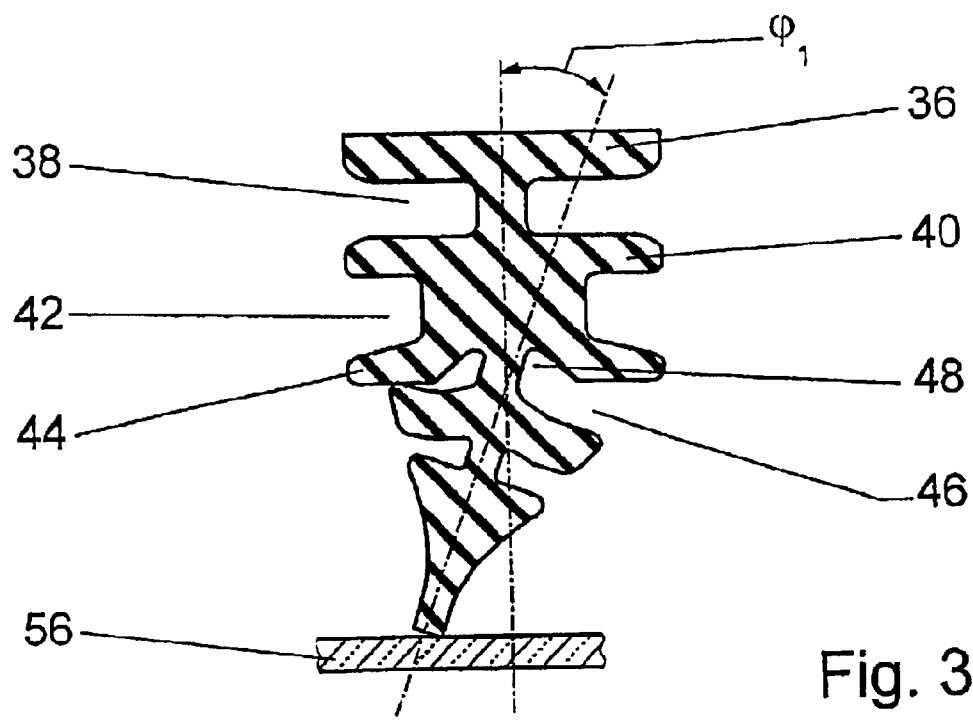
FIG. 3 is an enlarged view of a wiper rubber profile in partially folded-over position.

The profile of the wiper strip 18 without springs 24 is also shown enlarged in FIG. 3. A cover strip 36 limits the opposing longitudinal grooves 38 for the springs 24 on the one side. On the other side, the longitudinal grooves 38 are limited by intermediate pieces 40 that also form a side wall for two more longitudinal grooves 42 into which the claws 16 of the claw strips 14 grip. The longitudinal grooves 42 are limited on the side facing the vehicle window 56 by further cover strips 44, the purpose of which is to prevent the claws 16 from damaging the surface of the vehicle window 56 to be wiped during operation of the windshield wiper. The dimensions of the previously-described parts of the profile spine 20 depend on the vehicle type and the thickness of the springs 24, so that the cover strip 36 is 0.5 to 2 mm high, the intermediate walls 40 between the longitudinal grooves 38 and 42 have a thickness of 0.6 to 1.0 mm, and the cover strips 44 between the longitudinal grooves 42 and the functional part 22 have a thickness of 0.5 to 1.0 mm.

According to the invention, the first tilting bridge piece 26—the connection between the profile spine 20, and the functional part 22—is formed by two opposing open spaces 46 extending in the longitudinal direction of the wiper strip 18 and advantageously has a width of 0.5 to 1 mm and a height of 0.6 to 1.4 mm. In the drawing, the tilting bridge piece 26 has an elastic deformation that occurs at the beginning of the folding-over action at the reversal points of the swivelling movement. The functional part 22 is thereby tilted to one side at a first partial tilt angle $\phi_1$, and a shoulder 50 on the upper edge of the trapezoidal supporting section 30 that is also located on this side bears against the cover strip 44. The dimension of the partial tilt angle $\phi_1$ or the deformation of the tilting bridge piece 26 is determined by the height of the open space 46, which amounts to 0.6 to 1.4 mm according to the invention. So as to elastically deform the first tilting bridge piece 26 as little as possible, however, the open spaces 46 expand in the region of the first tilting bridge piece 26 toward the profile spine 20 by means of undercuts 48 that are 0.4 to 0.8 mm high.

The second tilting bridge piece 28 is also formed by two opposing open spaces 52 extending in the longitudinal direction of the wiper strip 18 that have a height of 0.3 to 0.8 mm and a distance of 0.8 to 1.5 mm from the upper edge of the supporting section 30. The second tilting bridge piece 28 is located in the middle of the functional part 22 between the open spaces 52 and has the same height and a width of 0.4 to 1 mm.

Figure 4:
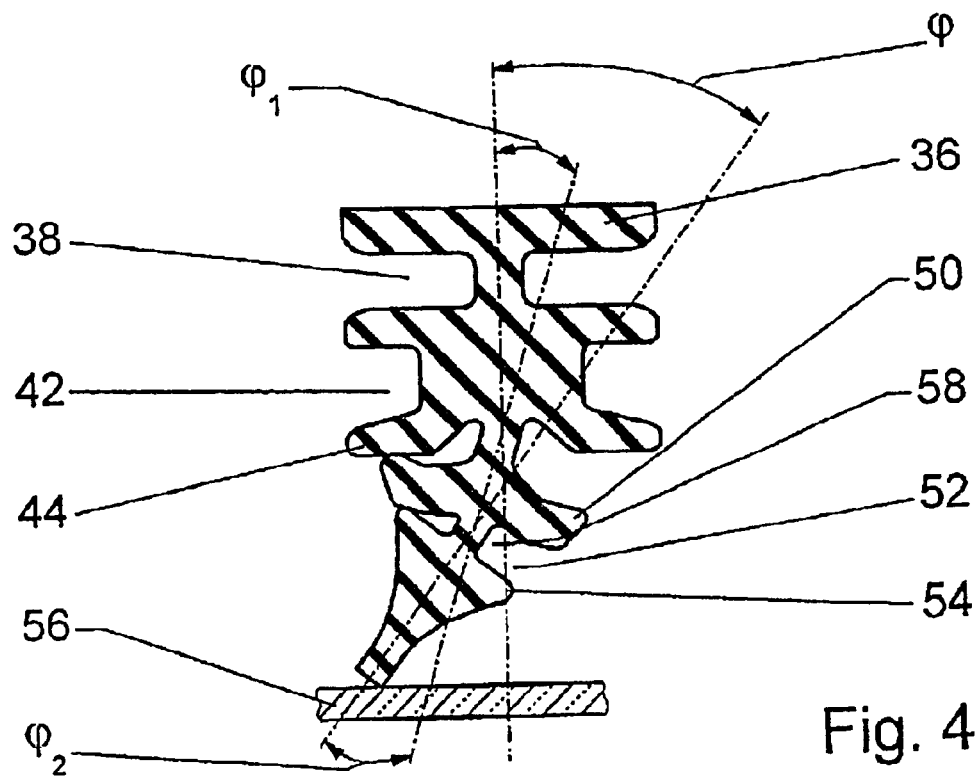
FIG. 4 is an enlarged view of a wiper rubber profile in working position.

In FIG. 4, the functional part 22 is completely folded over and therefore shown in the end position of the folding-over action. Here, a top shoulder 54 of the wiper wedge 32 bears against a lower edge of the supporting section 30. A tilt angle $\phi$ in relation to the vehicle window required for the working position of the wiper lip 34 is consequently formed by a first partial tilt angle $\phi_1$ and a second partial tilt angle $\phi_2$. In order to achieve a smallest-possible elastic deformation of the second tilting bridge piece 28 as well, undercuts 58 expand the open spaces 52 in the region of the second tilting bridge piece 28 by 0.2 to 0.4 mm in height.

Figure 5:
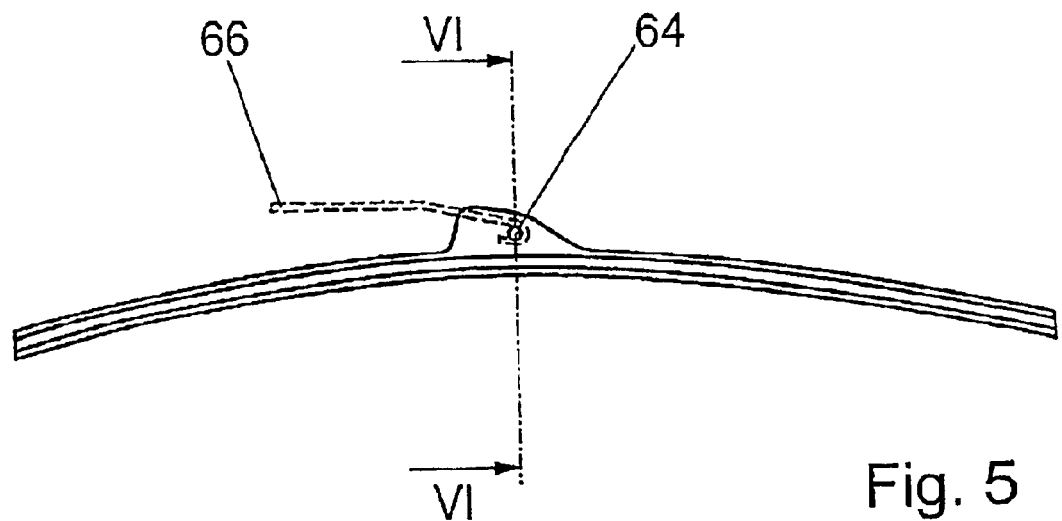
FIG. 5 is an unarticulated wiper blade.
Figure 6:
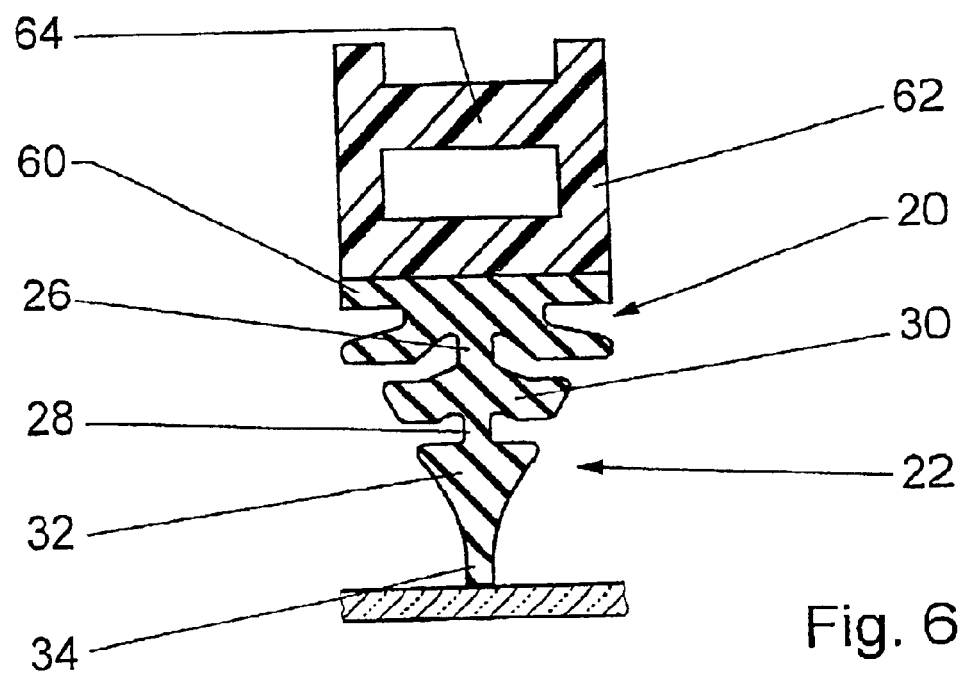
FIG. 6 is a view along the line VI—VI in FIG. 5.

In the embodiment shown in FIG. 5 and FIG. 6, the profile spine 20 comprises a cover strip 60 that is secured to an unarticulated carrier 62, e.g., by means of cementing, vulcanization, or another suitable procedure. The carrier 62 is composed of an elastic material, e.g., metal or a plastic that can also be strengthened using glass fibers or carbon fibers. It has an articulated axle 64 that is enclosed by a hook-shaped end or an adapter of a wiper bar 66. The carrier 62 is curved in the longitudinal direction, so that a pressure force distributed across the length results when it is pressed against the vehicle window 56.

What is claimed is:

1. A wiper strip (18) for windshield wipers, comprising:
   a profile spine (20) and a functional part (22) that is connected to the profile spine (20) via a tilting bridge piece (26) and that bears against it in the tilted position, wherein the functional part (22) includes a supporting section (30) that is connected to the profile spine (20) via the first tilting bridge piece (26) and to a wiper wedge (32) via a second tilting bridge piece (28), wherein the profile spine (20) has a total width of 6 to 10 mm and a total height of 3.5 to 7 mm, wherein grooves (38) for accommodating springs (24) are provided on the opposing longitudinal sides, wherein the thickness of the springs (24) is between 0.7 and 1.2 mm and the width of each spring (24) is between 2.5 and 4.5 mm, wherein the profile spine (20) is limited at the top by means of a cover strip (38) that is 0.5 to 2 mm high, wherein further opposing longitudinal grooves (42) abut the longitudinal grooves (38) in the direction facing the functional part (22), wherein intermediate walls (40) between the longitudinal grooves (38) and (42) have a thickness of 0.6 to 1 mm, and wherein covers strips (44) between the longitudinal grooves (42) and the functional part (22) have a thickness of 0.5 to 1 mm.

2. The wiper strip (18) according to claim 1, wherein the first tilting bridge piece (26) and the second tilting bridge piece (28) are coordinated with each other in such a fashion that, when the functional part (22) tilts, the first tilting bridge piece (26) folds completely over at first, and the supporting section (30) bears against the profile spine (20), while the second tilting bridge piece (28) then folds over and the wiper wedge (32) of the functional part (22) bears against the supporting section (30) with one shoulder (50).

3. A wiper strip (18) for windshield wipers, comprising:
a profile spine (20) and a functional part (22) that is connected to the profile spine (20) via a tilting bridge piece (26) and that bears against it in the tilted position, wherein the functional part (22) includes a supporting section (30) that is connected to the profile spine (20) via the first tilting bridge piece (26) and to a wiper wedge (32) via a second tilting bridge piece (28), wherein the functional part (22), including the supporting section (30), has its greatest width of preferably 4 to 8 mm on the side facing the first tilting bridge piece (26), wherein the width of the supporting section (30), a wiper wedge (32), and the wiper lip (34) decreases continuously toward the exposed end of the wiper lip (34) to a value of 0.5 to 1 mm.

4. The wiper strip (18) according to claim 3, wherein the functional part (22), including the supporting section (30), has a total height of 4 to 7 mm.

5. A wiper strip (18) for windshield wipers, comprising:
a profile spine (20) and a functional part (22) that is connected to the profile spine (20) via a tilting bridge piece (26) and that bears against it in the tilted position, wherein the functional part (22) includes a supporting section (30) that is connected to the profile spine (20) via the first tilting bridge piece (26) and to a wiper wedge (32) via a second tilting bridge piece (28), wherein the second tilting bridge piece (28) is formed by two opposing open spaces (52) extending in the longitudinal direction of the wiper strip (18) that are 0.3 to 0.8 mm high and are situated 0.8 to 1.5 mm away from the upper edge of the supporting section (30), wherein a distance of 0.4 to 1 mm remains between the open spaces (52) in the middle of the functional part (22) for the second tilting bridge piece (28), and wherein the height of the second tilting bridge piece (28) corresponds to the height of the open spaces (52).

6. The wiper strip (18) according to claim 5, wherein the open spaces (52) expand in the region of the second tilting bridge piece (28) toward the supporting section (30) by means of an undercut (58) that increases the height of the open spaces (52) by 0.2 to 0.4 mm.

7. A wiper strip (18) for windshield wipers, comprising:
a profile spine (20) and a functional part (22) that is connected to the profile spine (20) via a tilting bridge piece (26) and that bears against it in the tilted position, wherein the functional part (22) includes a supporting section (30) that is connected to the profile spine (20) via the first tilting bridge piece (26) and to a wiper wedge (32) via a second tilting bridge piece (28), wherein the first tilting bridge piece (26) is formed by two opposing open spaces (46) extending in the longitudinal direction of the wiper strip (18) and has a width of 0.5 to 1 mm and a height of 0.6 to 1.4 mm, wherein the open spaces (46) have a height of 0.4 to 0.8 mm and expand in the region of the first tilting bridge piece (26) toward the profile spine (20) by means of undercuts (48).

8. The wiper strip (18) according to claim 7, wherein the profile spine (20) is secured to an unarticulated carrier (62) by means of a cover strip (60).

* * * * *